United States Patent

[11] 3,616,333

[72] Inventor John B. Farmakides
702 6th St. S.W., Washington, D.C. 20024
[21] Appl. No. 850,239
[22] Filed Aug. 14, 1969
[45] Patented Oct. 26, 1971
Continuation-in-part of application Ser. No. 500,236, Oct. 21, 1965, now abandoned.

[54] METHOD FOR PRODUCING HALOGENS
4 Claims, No Drawings
[52] U.S. Cl. ..................... 204/128,
204/157.1 R
[51] Int. Cl. .................................. C01b 7/00,
B01j 1/10
[50] Field of Search ......................... 204/157.1,
54, 98, 128

[56] References Cited
UNITED STATES PATENTS
3,429,793 2/1969 Hellund ..................... 204/157.1 R
3,405,045 10/1968 Hoskins ..................... 204/158

*Primary Examiner*—John H. Mack
*Assistant Examiner*—R. L. Andrews

ABSTRACT: An improvement in the process of converting halide ions to the elemental halogen utilizing the assistance of high-intensity coherent electromagnetic radiation in the form of a laser beam. A solution of the halide ion in an electrochemical cell is electrolyzed and at the same time subjected to irradiation by means of a laser beam. The radiation is of such wavelength that the photons in the radiation are selectively absorbed by the ions in solution and energize them sufficiently to greatly enhance their conversion to the gaseous halogen.

METHOD FOR PRODUCING HALOGENS

DESCRIPTION OF THE PRIOR ART

This is a continuation in part of my earlier filed patent application Ser. No. 500,236, filed Oct. 21, 1965 now abandoned.

This invention relates to an improvement in the conversion of halide ions in solution to the free halogen, whereby electrolytic conversion is greatly facilitated through the use of high intensity coherent electromagnetic radiation in the form of a laser beam. More particularly, a method is provided whereby the conversion of halide ions to the free halogen is assisted by exposure to a laser beam of such wavelength that the radiant energy is selectively absorbed by the ions in solution which then becomes sufficiently energized so that the conversion of the halide ion to free halogen is greatly facilitated.

Laser (light mplification by timulated emission of radiation) and maser (microwave amplification by stimulated emission of radiation) applications to chemical technology have developed interest recently, and a number of investigators have reported chemical reactions induced or assisted by such high intensity coherent electromagnetic radiation.

While the effects of coherent electromagnetic energy on various chemicals have been observed by prior art workers, little is known of the mechanism for causing reactions to take place. It has been postulated that the selective absorption of the photons by certain materials cause an integral change in the energy levels of the individual atoms, thus increasing the reactivity of the atoms.

In the selection of a suitable electromagnetic energy source for use in my novel system, it is first necessary to consider some of the aspects of quantum absorption by a solution. There is considerable evidence that free radicals are produced during photon bombardment from a coherent source, and Derr et al. have reported detection of free radicals by an electron spin spectrometer in *Appl. Opt.*, Vol. 3, No. 6, pages 786-7 (1964).

It has been observed by others that a ruby laser pulsed at about 1 microsecond produced boiling when passed through degassed water. It may be assumed that this absorption by pure water merely converted the electromagnetic energy to thermal energy.

In the present case, it may be that the above mechanisms are operating in addition to the possibility that excitation of the halide ions by means of a laser beam causes the ions to become sufficiently excited as to facilitate the elimination of electrons necessary for the halide ion to be converted to elemental halogen.

BACKGROUND OF THE INVENTION

Laser and maser operation is based on absorption of light and on stimulated emission. The same wavelength of light that causes transitions of electrons in atoms and molecules from a low energy level to a higher level can cause a stimulated transition from the high level down to the lower level. The probability of a transition in either direction is the same. The number of transitions per unit of time is proportional to the transition probability and the number of electrons in the energy level where the transition starts. In lasers, light from an intense source causes many transitions from a low energy level to an upper level, bypassing an intermediate level.

For laser or maser action to take place, there must be a sufficient intensity of stimulating radiation present at the particular wavelength needed to sustain this reaction. Once a material begins to emit energy (i.e., to "lase"), it produces more radiation to stimulate the action and the action increases.

It is an object of this invention to provide methods and apparatus for utilizing optical and microwave quantum energy for converting halide ions to halogen gas. It is a further object of this invention to provide a system for treating saline solutions such as sea water with high intensity coherent electromagnetic radiation from a laser beam such that the radiation will be absorbed by chloride ions contained in the solution, thus causing the chloride ions to be converted to elemental chlorine.

SUMMARY OF THE INVENTION

In accordance with the present invention, a system is provided for the conversion of halide ions to the free halogen through the irradiation of a solution of the halide ions with high intensity coherent electromagnetic radiation from a laser source.

Probably the most widely studied of laser devices is the ruby laser, which is capable of generating optical quantum energy in excess of 10,000 watts per square centimeter of beam area in a pulse of red light in a wave bandwidth less than one Angstrom unit (A) centered at 694A. The parameters used in the study of ruby lasers are helpful in connection with the present invention, even though other energy sources may be preferred.

As reported by Mutschlecner et al. in Applied Optics, Vol. 2, No. 11, pages 1,202-3 (1963), light pulses from a ruby laser passed through an aqueous medium was attenuated and had a range of about 60 meters at a power of 200 watts. Curcio et al. observed that attenuation through a similar liquid was less than one-tenth as much for a laser operating in the green wavelengths (about 4900A) as for a ruby laser.

The selection of the proper wavelengths for maximum effectiveness in selectively energizing halide ions, while maintaining other matters substantially unchanged, is important in the practice of this invention only to the extent that the radiation fall within the continuous absorption range of the halide ion selected. The current density at the electrode surfaces may be readily calculated from the amount of current flow and from the surface area of the electrode.

Halogen gas may be used as a source of quantum energy for energizing halide ions in aqueous solution. Laser lines have been observed for chlorine in a narrow band at about 1.9754 microns and at 2.0200 microns. At a pressure of about 0.04 to 0.6 mm. Hg. absolute pressure, radio frequency excitation may be utilized to cause chlorine gas to lase. Addition of helium to the halogen gas intensifies the radiation. Construction of a suitable energy source, not a part of this invention, is described by Paananen et al. in *Applied Phys. Letters*, Vol. 3, No. 9, pages 154-5 (1963).

Specific wavelengths are thus not considered a critical factor to the present invention with the prime requisite being that the radiation produced must be capable of absorption by halide ions and sufficiently intense to produce the required excitation energy to effect lasing of the halogen in solution. Energy levels of lasers operating in this range are in the order of 25 to 50 megawatts per pulse with duration of 25 to 50 nanoseconds.

An example of an electromagnetic source having a wavelength and sufficient intensity to cause halide ions to lase is the ruby laser. For example, the overall absorption range for chloride ions is from 2251.50A to 6952.13A with continuous absorption starting at a wavelength of approximately 4795.54A. This leaves a continuous absorption band range of 2156.59A for which a range of lasers can be used. Thus, a ruby laser which is capable of generating optical quantum energy in excess of 10,000 watts per square centimeter in a wave band width less than an A centered at 6943A is sufficiently close to the absorption peak for chlorine to produce the required excitation energy.

Production of chlorine from salt solutions containing the chloride ion by electrolysis is a principal method now used for obtaining this valuable chemical. This method comprises the oxidation of the anion to its elemental state at the anode of an electrochemical cell. The power requirements are high, as a result of the voltage necessary to convert the chloride ion. The current passed through the cell in generating a given quantity of chlorine gas is substantially constant, and reductions in power are achieved by lowering the applied voltage in the electrochemical cell.

Electrolysis in the usual sense for electrodeposition at the decomposition voltage of the ions in solution is not carried to completion in the classical sense because the applied potential is below that required for the oxidation/reduction reactions of the ions in solution. The electrolysis principle is used in one embodiment of the present invention merely to create a potential difference across the cell and to obtain a maximum concentration of chlorine ions in the vicinity of the anode in order to render more effective the use of the coherent light energy principle described herein. The use of an electrolytic process is neither intended or in any way implied as being the only basis for the process; however, in addition to accumulating ions, it provides a basis for sweeping excess electrons from the anodic region by current flow through the external circuit.

The sodium ions accumulating in the vicinity of the cathode should react with the aqueous solvent to produce sodium hydroxide. For the standard electrolysis of a saline solution in an electrolytic cell, the cations present in the solution at the cathode are $H^+$ and $Na^+$. Using a 6N solution as an example, the concentration of $H^+$ would be $10^{17}$ and the potentials would be $E_H = 0 - 0.059 \log 10^{17} = 0.41$ volts. $E_{Na} = +2.71 - 0.059 \log 6 = +2.66$ volts. Since the hydrogen gas is $0.41 + 0.2 = +0.61$ volt. This is so much below that required for the sodium ion that the evolution of hydrogen would take place. In this example, only by raising the potential to a value approaching 2.66 volts by a large increase of current would Na ion be discharged. For a 6N solution using a laser focused on the anode area of the cell a potential of less than 0.41 volts would be adequate.

At the anode the ions present are $OH^1$ and $Cl^1$. The standard oxidation potentials of $O_2$ and $Cl_2$ are $-0.40$ and $-1.36$ respectively, and hence the reversible potentials are:

$$E_O = -0.40 + 0.059 \log 10^{17} = -0.81 \text{ volt}.$$

$$E_{Cl} = -1.36 + 0.059 \log 6 = -1.31 \text{ volts}.$$

Allowing for the overvoltage (0.6 volt), the oxygen evolution potential resulting from the discharge of OH ion is $-0.81 -0.6$ volt or $-1.41$ volts, and hence the discharge of chlorine ions and the formation of chlorine gas will take place preferentially. By increasing the anode potential, however, oxygen evolution would occur. Accordingly, in the use of a laser beam, the potential would be maintained sufficiently low so as to cause the ionization and discharge to occur in such a manner as to be preferential to the chlorine. It is believed that this is the mechanism by which the present invention converts halide ions to halogen gas at the anode of an electrochemical cell. By energizing the chloride ion in the vicinity of the anode used in a conventional electrochemical cell less voltage is required for the conversion of the ion to the elemental state.

Where the laser is used in conjunction with an electrolytic cell, removal of the electron flow from the chloride ions, which are accumulating in the vicinity of the anode, would be accomplished through the external circuit of the cell. Chlorine would be accumulated and removed from the anode chamber and if a permselective membrane is not used for migration of sodium ions, hydrogen would be evolved and removed from the cathode chamber.

EXAMPLE

A standard anode of a conventional type having a platinum or carbon surface is disposed in an aqueous solution of sodium chloride at a concentration of 3.5 weight percent. A steel cathode is used and a direct current power source is connected to the electrodes to provide a variable potential across the cell. A current is passed through the cell and chlorine is evolved at the anode and removed from the system.

The source of radiation, in this case a laser beam, is directed to the electrolyte in the anode portion of the cell. In the higher energy lever, produced by excitation resulting from absorption of the radiation, the chloride ions at the anode are more easily converted to the elemental halogen and a decrease in the power normally required for the electrolysis is realized.

In a practical embodiment of the invention, sodium ions may be removed from the solution by migration through a membrane, such as a permselective styrene-sulfonic acid resin which is selectively permeable to cations. Thus the electrical neutrality of the desalinated solution is maintained.

The examples given have been directed toward a preferred embodiment of the process, the conversion of chloride ions in aqueous solutions to chlorine gas; however, within the scope of this invention other halogen elements may be recovered, such as flourine or bromine. Also, nonaqueous solvents which ionize chloride compounds and transmit coherent electromagnetic radiation may be used. These include alcohols, organic acids, etc.

Apparatus for use with the halogen conversion process can be constructed in configurations similar to those shown by Johnson et al. in U.S. Pat. No. 2,972,697, issued Feb. 21, 1961, in which a system is disclosed for treatment of chemicals by maser excitation. Also, modification of the microwave apparatus of Frazer et al. in U.S. Pat. No. 2,994,652, issued Aug. 1, 1961, may be used. In the embodiment of the process for energizing chloride ions with coherent electromagnetic radiation combined with direct current treatment of the solution, electrodes may be disposed adjacent the portion of the fluid treatment chambers of the above-identified patents through which the radiation passes. Suitable heating or cooling devices may be mounted on the apparatus to control reaction conditions in the conversion process.

Temperature of the process for energizing halide ions by coherent laser or maser beams may vary widely. In general, as long as the thermal conditions of the system are sufficient to maintain the halide ions in solution and simultaneously transmit radiation through the solvent, the process is operable. For an aqueous solvent, the system retains chloride ions between 0° C., the freezing point of pure water, and above 100° C., the boiling point of pure water. Temperatures above and below these may be employed depending upon the liquid composition. Likewise, the pressure of the treated liquid may vary considerably, and provide an operable system so long as the treated liquid is maintained in a liquid state and the solute is ionized.

Either a continuous process or a batch process may be run using this concept of energizing ions. The flow rates of treated liquids are not critical, but some consideration should be given to concentration phenomena occurring in the solution being treated.

As halide ions are energized and removed from the path of the electromagnetic waves, a depletion of halogen is observed and a corresponding decrease in halide ion concentration will result. This would result in transmission of the laser or maser beams through the solution without absorption if the solution became totally depleted of ions capable of absorbing the particular wavelength. This condition may be remedied in part by agitation of the treated solution to transport fresh solute to the treatment area, or causing the solution to continuously flow past the treatment area. Normally natural migration of halide ions toward the lower concentration will provide further material, but this mechanism can be improved by agitation by some suitable means such as stirring or ultrasonic vibrations.

While I have herein shown and described a preferred form of my invention, manifestly it is susceptible of modification and rearrangement of the steps and parts without departing from the spirit and scope thereof.

What is claimed and desired to be secured by Letters Patent is:

1. In a process for the electrolytic conversion of halide ions in solution to the elemental halogen whereby a solution of the halide ion is subjected to a current in an electrochemical cell consisting of an anode portion and a cathode portion, the improvement comprising simultaneously during electrolysis subjecting the anode portion to high intensity coherent electromagnetic radiation from a laser.

2. The improvement described in claim 1 wherein the coherent electromagnetic radiation is of a wavelength corresponding to the high absorption range of the halide solution.

3. The improvement described in claim 1 wherein the solution to be electrolyzed is brine.

4. The improvement described in claim 1 wherein the halide is chloride.

* * * * *